United States Patent [19]
Walsh et al.

[11] Patent Number: 5,952,943
[45] Date of Patent: Sep. 14, 1999

[54] ENCODING IMAGE DATA FOR DECODE RATE CONTROL

[75] Inventors: Thomas E. Walsh, Portland; Rohit Agarwal, Beaverton, both of Oreg.; Joseph N. Romriell, Hyde Park, Utah

[73] Assignee: Intel Corporation, Santa Clara, Calif.

[21] Appl. No.: 08/729,448

[22] Filed: Oct. 11, 1996

[51] Int. Cl.[6] .................................................. H03M 7/00

[52] U.S. Cl. ...................................... 341/50; 395/200.77

[58] Field of Search .................................. 341/50, 51, 65, 341/61; 395/200.77; 348/403

[56] References Cited

U.S. PATENT DOCUMENTS

5,748,903  5/1998  Agarwal .............................. 395/200.77

*Primary Examiner*—Brian Young
*Attorney, Agent, or Firm*—William H. Murray; N. Stephan Kinsella

[57] ABSTRACT

One or more encoding parameters are controlled during the encoding of image data based on a decode processing rate. By taking decode processing into account during encoding, a decoding system will be able to keep up with the demands for decoding the resulting encoded bitstream. In one embodiment, encoding parameters used for video encoding may be changed iteratively to achieve a specified target decode processing rate, which can change from frame to frame.

20 Claims, 11 Drawing Sheets

FIG. 11

ENCODING IMAGE DATA FOR DECODE RATE CONTROL

CROSS-REFERENCES TO RELATED APPLICATIONS

This nonprovisional U.S. national application, filed under 35 U.S.C. § 111(a), claims, under 35 U.S.C. § 119(e)(1), the benefit of the filing date of provisional U.S. national application no. 60/010,518, filed under 35 U.S.C. § 111(b) on Jan. 24, 1996 as attorney docket no. 366431-136P, the teachings of which are incorporated herein by reference. This application is also a continuation-in-part of U.S. patent application Ser. No. 08/558,258, filed Nov. 13, 1995 as attorney docket no. 366431-022 ("the '1022 application"), the teachings of which are incorporated herein by reference. This application is also a continuation-in-part of U.S. patent application Ser. No. 08/537,249, now U.S. Pat. No. 5,748,903, filed Sep. 29, 1995. This application is also related to U.S. patent application Ser. No. 08/568,247, filed Dec. 6, 1995 as attorney docket no. 366431-096 ("the '1096 application") and to U.S. patent application Ser. No. 08/671,382, filed Jun. 27, 1996 as attorney docket no. 366431-125 ("the '1125 application"), the teachings of both of which are incorporated herein by reference.

BACKGROUND OF THE INVENTION

1. Field of the Invention

The present invention relates to image processing, and, in particular, to encoding video signals.

2. Description of the Related Art

It is desirable to encode image data, such as motion video data, to reduce the number of bits used to represent the images for more efficient storage and/or transmission for subsequent playback. Conventional video encoders apply sophisticated encoding algorithms to achieve this video compression. These algorithms involve the control and selection of values to use for many different parameters involved in the encoding process. Typically, these parameters are controlled to achieve the highest quality output signal (e.g., the decoded video stream) for a specified target bit rate. The target bit rate specifies a goal for the average number of bits allocated for encoding each of the frames of the video sequence to be encoded. The video encoder adaptively and dynamically changes the values of different encoding parameters during the encoding processing to attempt to achieve the target bit rate. Other encoding parameters may be selected at the start of video encoding and left unchanged throughout a particular encoding session.

The present invention is directed to an improvement in such conventional parameter-driven video encoders that are designed to achieve a specified target bit rate.

Further objects and advantages of this invention will become apparent from the detailed description which follows.

SUMMARY OF THE INVENTION

The present invention is directed to the encoding of image data. A decode processing rate is used to control at least one encoding parameter, which is used to encode the image data to generate an encoded bitstream.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

Embodiments of the present invention are directed to image encoding schemes that take into account the rate at which the resulting encoded bitstream can be or will be decoded, for example, by particular decoding systems. When the processing capabilities of a decoding system are known or when they can be otherwise estimated, an embodiment of an encoding system in accordance with the present invention can tune the encoding algorithm to generate encoded image data in an attempt to provide a high quality visual result while staying within the processing limits of the decoding system. If the encoding system recognizes that more decode time is available, the encoding system can adjust the encoding system to provide a higher quality output which will typically use more decode time. In this context, such an encoding system is said to perform decode rate control, that is, controlling the encoding scheme based on expected decode processing rate.

One way to achieve decode rate control is to set a target decode processing rate (based on the processing capabilities of the decoding system) and then encode the image data to provide high-quality results while staying within that target decode processing rate. The target decode processing rate may be represented, for example, as a certain number of processing cycles per second.

If the encoding system determines that the decoding system will have additional processing capacity remaining after decoding the current version of the encoded data, then the encoding system may adjust one or more of the encoding parameters to increase the quality of the decoded image data. Those skilled in the art will understand that, in this context, a higher quality decoded image typically means a higher decode rate. Depending upon the implementation, the encoding system can re-encode the same image data using the adjusted encoding parameters or simply use the adjusted encoding parameters for subsequent image data.

On the other hand, if the encoding system determines that the decoding system will not have enough time to decode the current version of the encoded data, then the encoding system may adjust one or more of the encoding parameters to decrease the quality of the decoded image data. In this case, it may be preferable to re-encode the same image data using the adjusted encoding parameters before proceeding with subsequent image data.

In general, decode rate control may also be accompanied by conventional bit rate control to ensure that the encoded image data is based on transmission and/or storage volume constraints as well as decode rate constraints. Adjustments to encoding parameters under decode rate control may be made on a frame by frame basis. Alternatively, adjustments may be made within a frame or between multiple sets of frames (e.g., from key frame to key frame).

In order to determine or estimate the decode rate for a particular set of encoded image data, the encoding system may emulate the processing of the decoding system by actually decoding the encoded image data and measuring the time to decode. Alternatively or in addition, the encoding system may maintain a model of the decoding system to estimate decode processing rate as well as the effects that different changes to different encoding parameters will have on that decode processing rate.

Embodiments of the present invention are directed generally to controlling encoding parameters for any image processing taking the decode processing rate into account. For explanatory purposes, however, an embodiment of the invention will be described in the context of a specific video encoding algorithm. Those skilled in the art will understand that the invention applies equally well to other video and image processing schemes.

System Hardware Architectures

Figure 1:
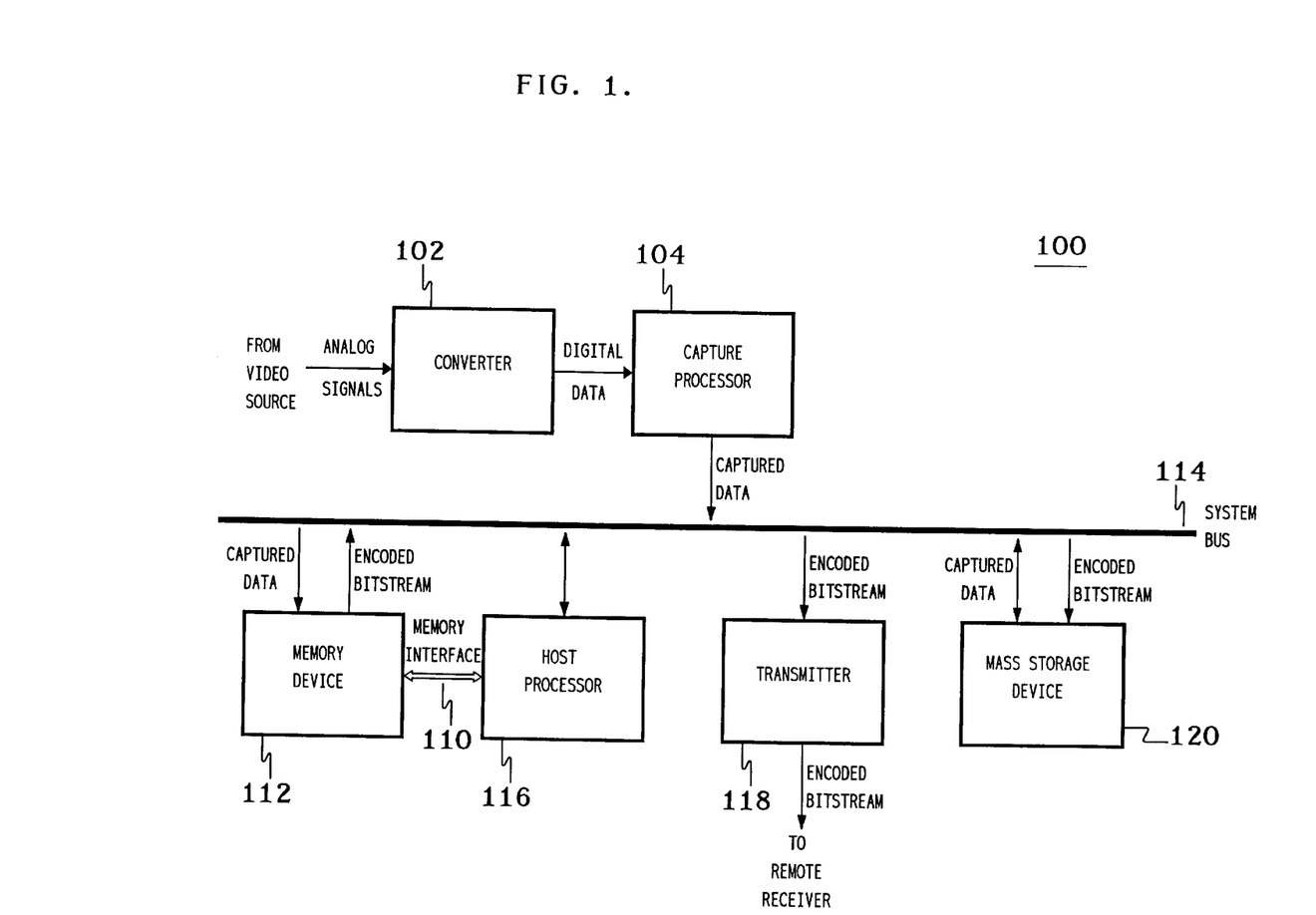
FIG. 1 is a block diagram of a computer system for encoding video signals, according to one embodiment of the present invention.

Referring now to FIG. 1, there is shown a block diagram of computer system 100 for encoding video signals, according to one embodiment of the present invention. The invention is, of course, not limited in scope to this particular embodiment. Converter 102 of encoding system 100 receives analog video signals from a video source. The video source may be any suitable source of analog video signals such as a video camera or VCR for generating local analog video signals or a video cable or antenna for receiving analog video signals from a remote source. Converter 102 separates the analog video signal into constituent components and digitizes the analog components into digital video component data (e.g., 24-bit RGB component data). In alternative embodiments of the present invention, the encoding system may receive and process digital video signals.

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:0) format, in which every (4×4) block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data may be stored to memory device 112, while for non-real-time encoding, the captured data may be stored to mass storage device 120. For non-real-time encoding, the captured data will subsequently be retrieved from mass storage device 120 and stored in memory device 112 for encode processing by host processor 116.

In one embodiment, during encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
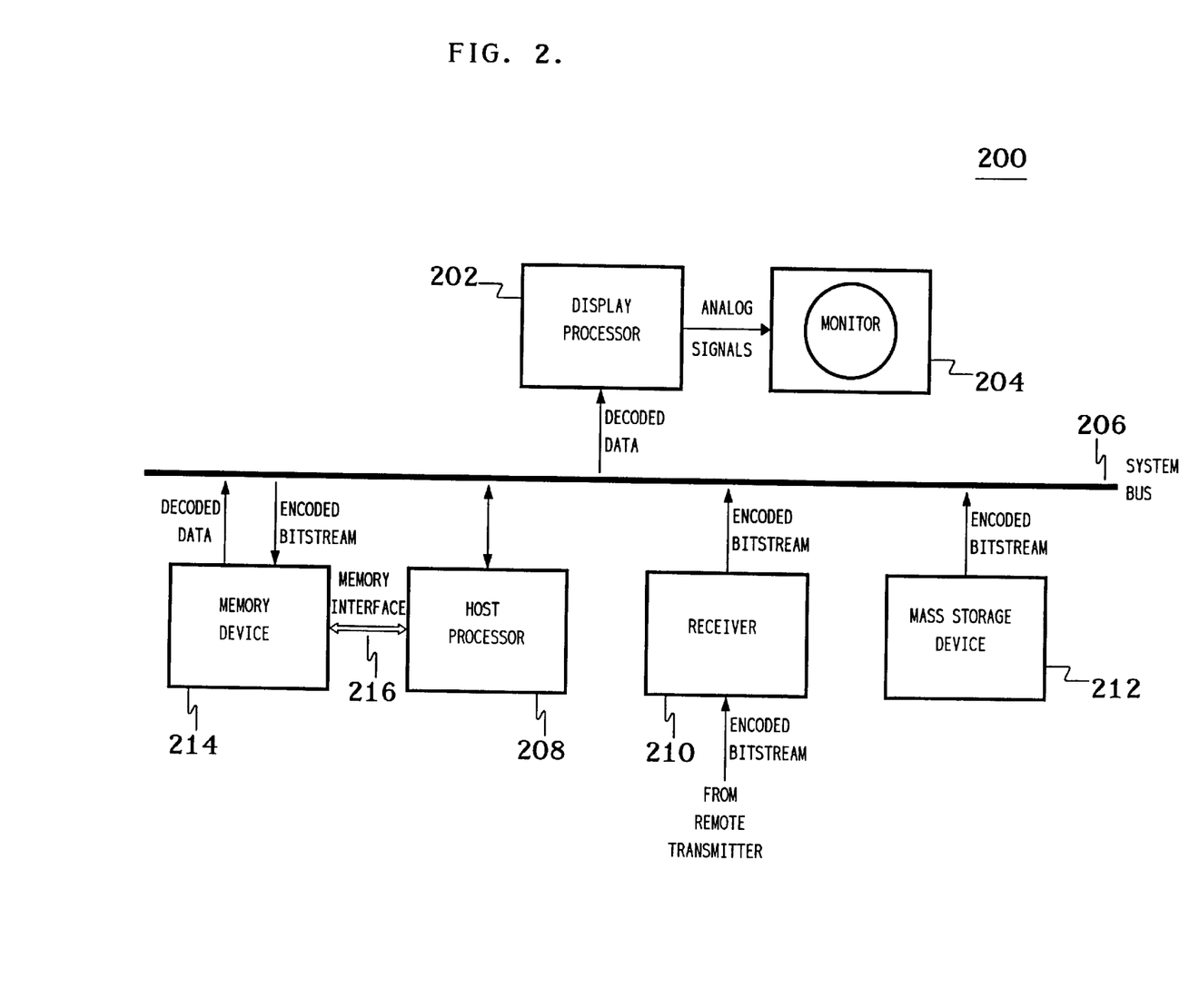
FIG. 2 is a block diagram of a computer system for decoding the video signals encoded by the computer system of FIG. 1, according to one embodiment of the present invention.

Referring now to FIG. 2, there is shown a block diagram of computer system 200 for decoding the encoded video bitstream generated by encoding system 100 of FIG. 1, according to one embodiment of the present invention. The encoded video bitstream may be either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1, although some information may have been lost during compression. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 may include digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 may be a microprocessor-based personal computer (PC) system with a special purpose video-processing plug-in board. In particular, converter 102 may be any suitable means for separating and digitizing analog video signals into digital video component data. Capture processor 104 may be any suitable processor for capturing digital video component data as subsampled frames. In one embodiment, converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 may be, for example, a general-purpose microprocessor manufactured by Intel Corporation, such as an i486™ microprocessor, Pentium® processor, or Pentium® Pro processor. System bus 114 may be any suitable digital signal transfer medium such as a peripheral component interconnect (PCI) bus. Memory device 112 may be any suitable computer memory device such as one or more dynamic random access memory (DRAM) devices. High-speed memory interface 110 may be any suitable means for interfacing between memory device 112 and host processor 116. Mass storage device 120 may be any suitable means for storing digital data such as a computer hard drive. Transmitter 118 may be any suitable means for transmitting digital data to a remote receiver such as a modem. Those skilled in the art will understand that the encoded video bitstream may be transmitted using any suitable means of transmission such as telephone line, RF antenna, local area network, or wide area network.

Referring again to FIG. 2, decoding system 200 may be a microprocessor-based PC system similar to the basic PC system of encoding system 100. In particular, host processor 208 may be any suitable means for decoding an encoded video bitstream such as a general-purpose microprocessor manufactured by Intel Corporation, such as an i486™ microprocessor, Pentium® processor, or Pentium®) Pro processor. System bus 206 may be any suitable digital data transfer medium such as a PCI bus. Mass storage device 212 may be any suitable means for storing digital data such as a CD-ROM device or a hard drive. Receiver 210 may be any suitable means for receiving the digital data transmitted by transmitter 118 of encoding system 100 such as a modem. Display processor 202 and monitor 204 may be any suitable devices for processing and displaying video images (including the conversion of digital video data to analog video signals) and may be parts of a PC-based display system having a PCI 24-bit graphics board and an RGB monitor, for example.

In one embodiment, encoding system 100 of FIG. 1 and decoding system 200 of FIG. 2 are two distinct computer systems. In an alternative embodiment of the present invention, a single computer system comprising all of the different components of systems 100 and 200 may be used to encode and decode video images. Those skilled in the art will understand that such a combined system may be used to display decoded video images in real time to monitor the capture and encoding of the video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Encode Processing

Figure 3:
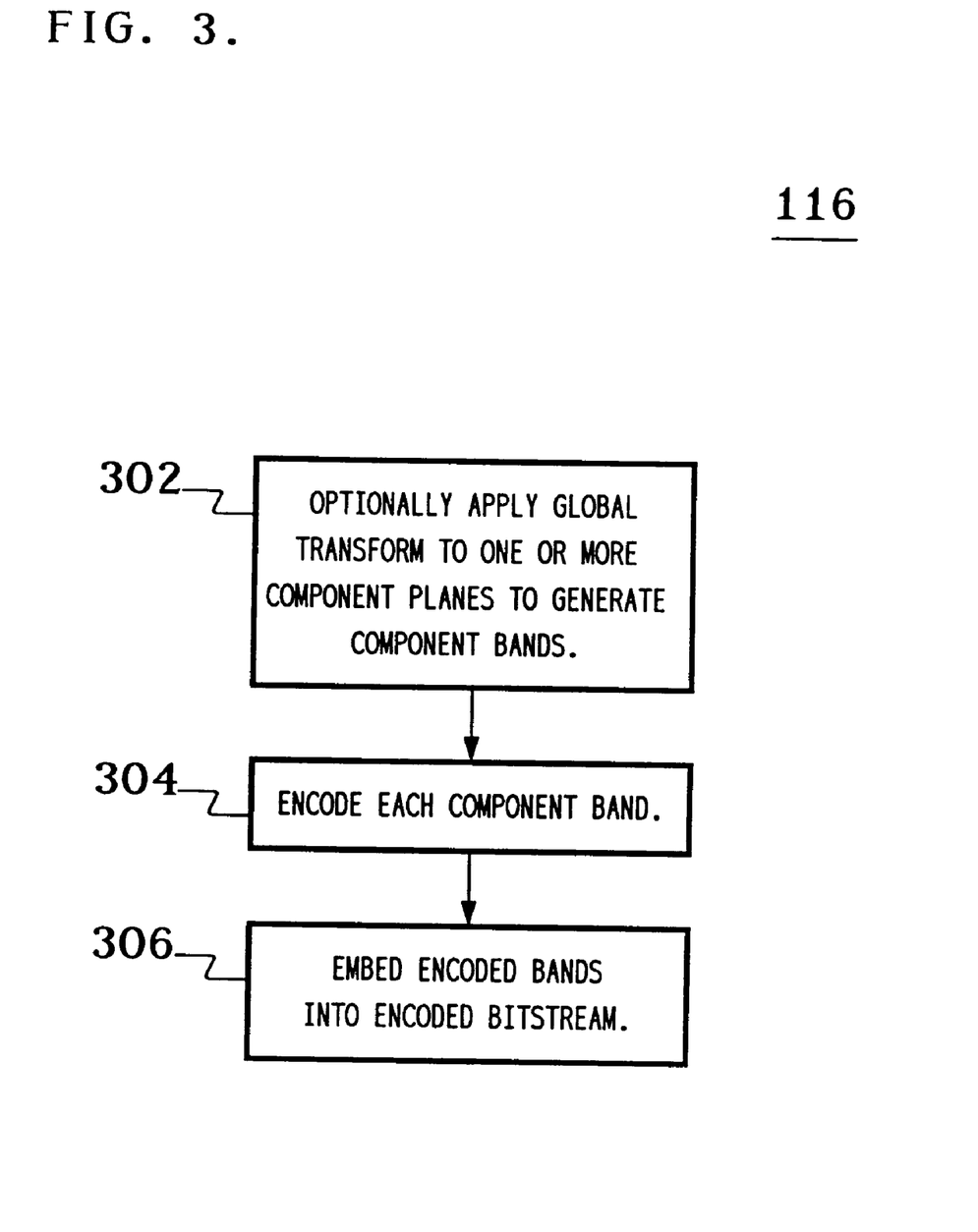
FIG. 3 is a process flow diagram of the compression processing implemented by the host processor of the encoding system of FIG. 1 for each frame of a video stream.

Referring now to FIG. 3, there is shown a process flow diagram of the compression processing implemented by host processor 116 of encoding system 100 of FIG. 1 for each frame of a video stream, according to one embodiment of the present invention.

Figure 4:
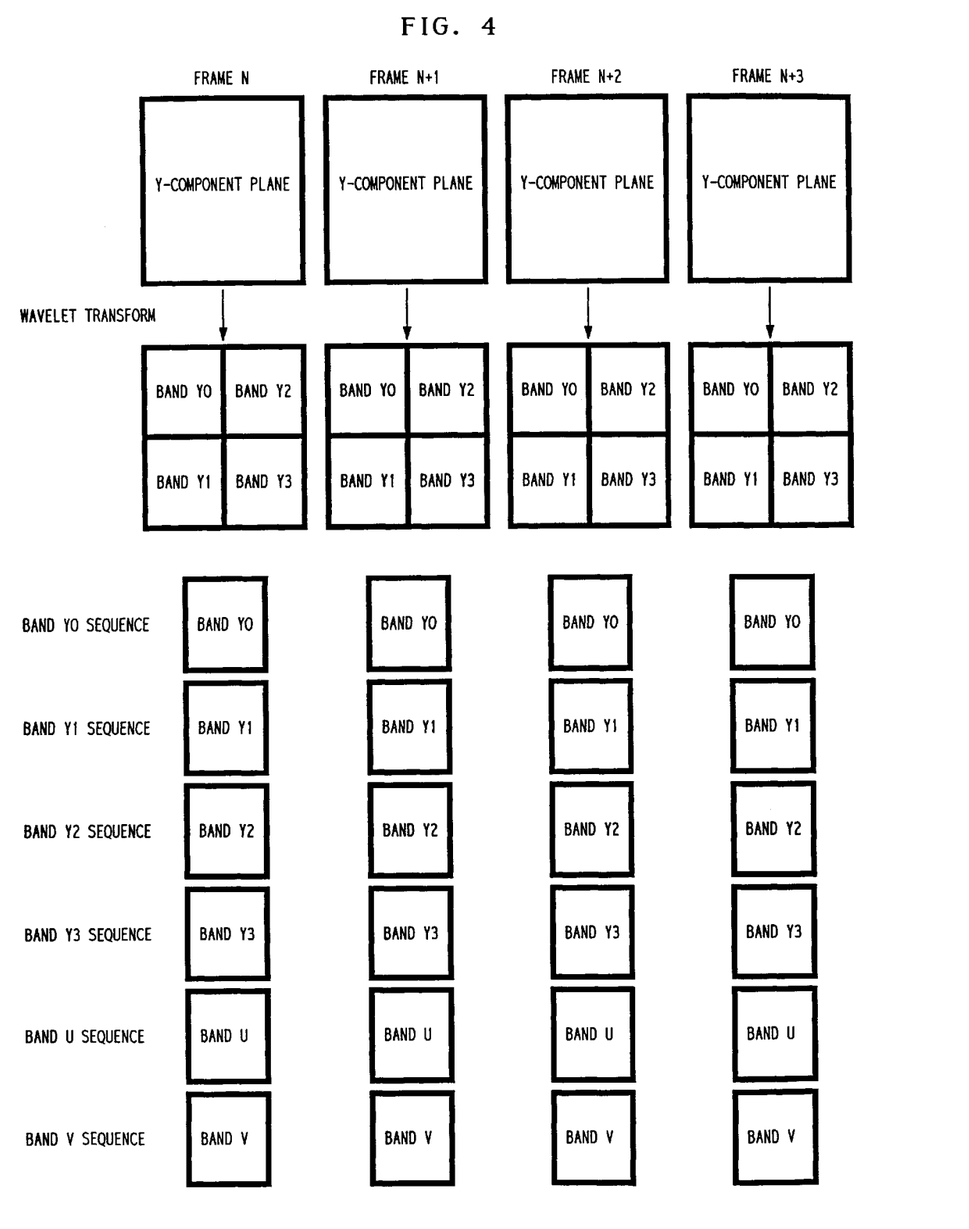
FIG. 4 shows a graphical representation of the six band sequences for the compression processing of FIG. 3.

In one embodiment, compression processing for each frame begins by optionally applying a global transform to one or more of the component planes to decompose the component planes into a plurality of bands (step 302). For example, a forward wavelet transform may be applied to the Y-component plane to globally decompose (i.e., transform) the Y-data into four separate bands of data, thereby producing a total of six bands of data for each frame: four Y-component bands, one U-component band, and one V-component band. FIG. 4 shows a graphical representation of the six band sequences. One forward wavelet transform is described in further detail in the '1022 application in the section entitled "Wavelet Transform." Those skilled in the art will understand that other transforms and other decomposition schemes may be applied in other embodiments of the present invention.

For purposes of this specification, the four Y-component bands are designated Band Y0, Band Y1, Band Y2, and Band Y3. The subsanpled U-component plane (which is not wavelet transformed) is designated Band U, and the subsampled V-component plane (which is also not wavelet transformed) is designated Band V.

Encode processing is then applied to each of the bands of the current frame (step 304 of FIG. 3), where each band is part of a distinct band sequence (e.g., see FIG. 4). The encoded bands are then embedded into the compressed video bitstream to complete the compression processing for the current frame (step 306). Steps 302-306 of FIG. 3 are repeated for each frame of the video stream.

Figure 5:
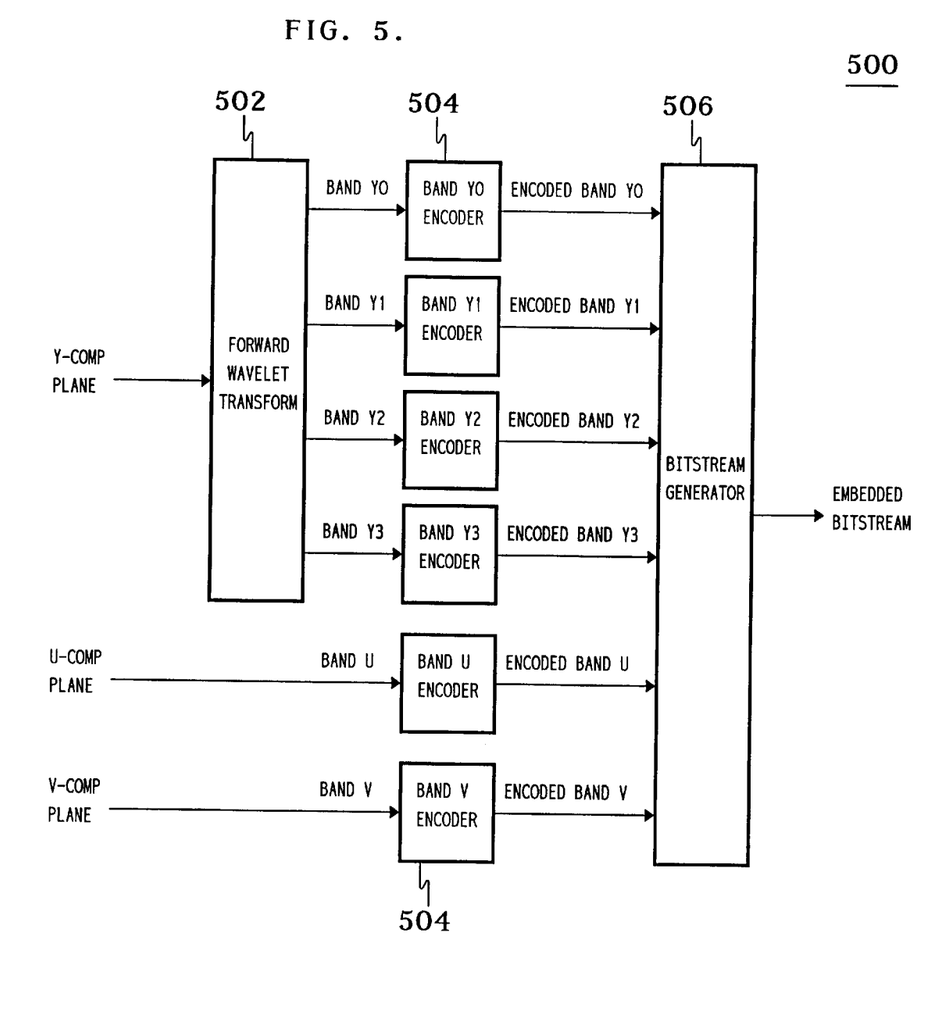
FIG. 5 is a block diagram of a frame encoder that implements the compression processing of FIG. 3.

Referring now to FIG. 5, there is shown a block diagram of frame encoder 500 which implements the compression processing of FIG. 3, when the forward wavelet transform is applied to only the Y-component plane. Transform 502 applies a forward wavelet transform to the Y-component plane of each frame to generate Bands Y0–Y3 (step 302 of FIG. 3). Band encoders 504 encode the six bands of data (step 304 of FIG. 3) and bitstream generator 506 embeds the resulting encoded bands into the encoded video bitstream (step 306 of FIG. 3). In one embodiment, there is a single band encoder 504 that sequentially encodes the different bands.

Figure 6:
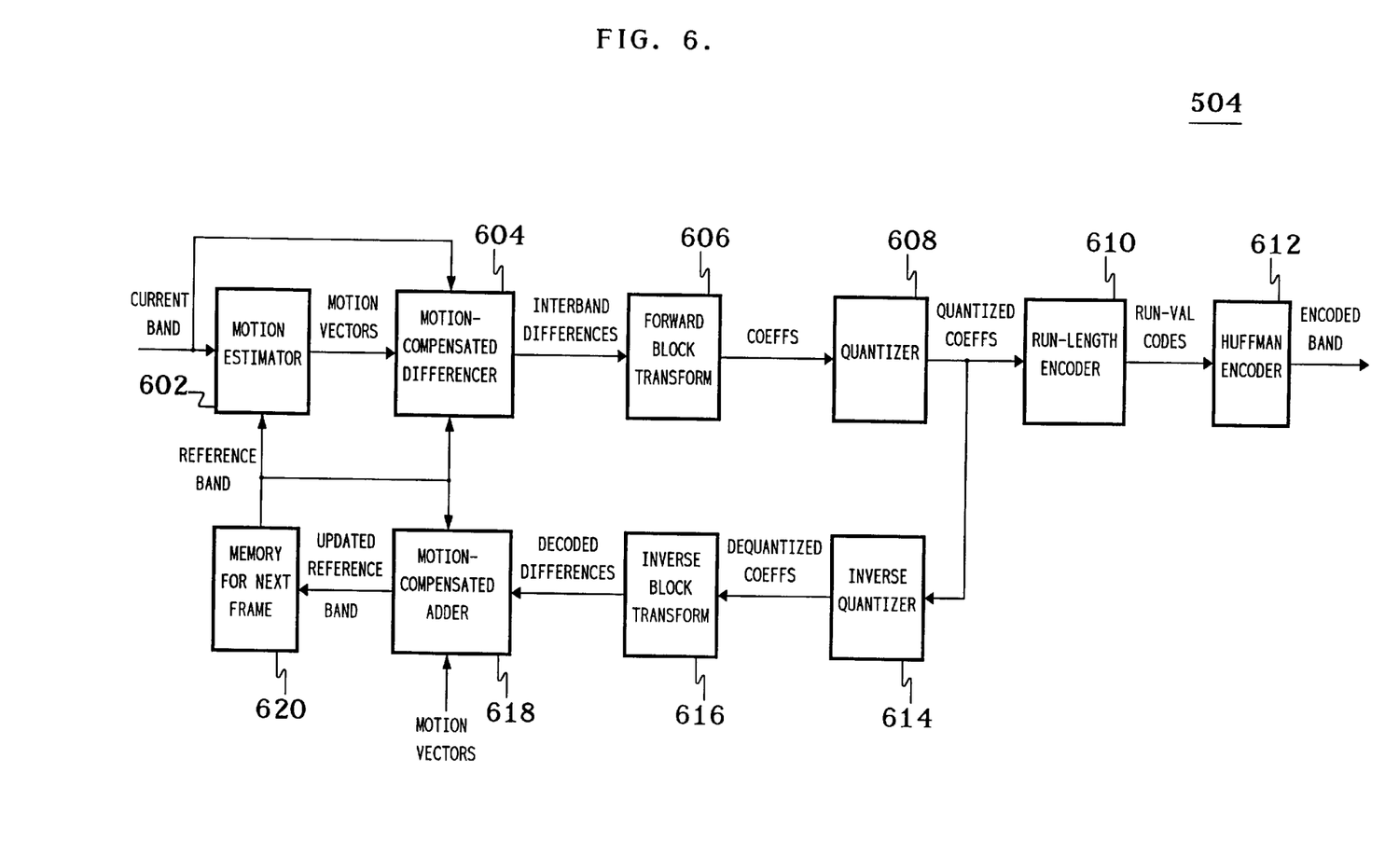
FIG. 6 is a block diagram of each band encoder of FIG. 5 when the coder applies inter-frame encoding to a component band.

Referring now to FIG. 6, there is shown a block diagram of each band encoder 504 of FIG. 5 when band encoder 504 applies inter-frame encoding to a component band, according to one embodiment of the present invention. The inter-frame encoding may be either uni-directional or bi-directional interframe encoding. Band encoder 504 is also capable of applying intra-frame encoding, in which case, the motion estimation of 602, motion-compensated differencing of 604, and the motion-compensated addition of 618 are not performed.

For inter-frame encoding, motion estimator 602 of FIG. 6 performs motion estimation on macroblocks of the current band relative to a reference band to generate a set of motion vectors for the current band. The processing of motion estimator 602 is described in further detail in the '1022 application in the section entitled "Motion Estimation."

Motion-compensated differencer 604 applies the appropriate motion vectors to the reference band to generate a motion-compensated reference band. Differencer 604 also generates interband differences for the current band using the motion-compensated reference band and the current band.

A forward block transform 606 is applied to each block to generate coefficients for the current band. In one embodiment, transform 606 may selectively apply any of the following transforms: a DCT transform, a slant transform, a Haar transform, or a "Slaar" transform which is a hybrid of a slant transform and a Haar transform. The selected transform may be either a one-dimensional or two-dimensional transform, and may differ from band to band. In addition, transform 606 may be disabled for any band, so that the block signals are not transformed before quantization. The processing of forward block transform 606 is described in further detail in the '1022 application in the sections entitled "Block Transform" and "Decode Rate Control." For intra-frame encoding, the forward block transform 606 is applied directly to the block of band signals, rather than to inter-frame difference signals.

Quantizer 608 quantizes the coefficients to generate quantized coefficients for the current band. Quantizer 608 applies uniform scalar quantization, wherein each coefficient is divided by a specified integer scale factor. The processing of quantizer 608 is described in further detail in the '1022 application in the section entitled "Adaptive Quantization."

Run-length encoder 610 transforms the quantized coefficients into run-length encoded (RLE) data. In one embodiment, run-length encoder 610 applies adaptive run-length encoding to generate a sequence of run-val pairs for each block of quantized coefficients, where each run-val pair is a value corresponding to the length of a run of zero coefficients (i.e., coefficients that are quantized to zero) followed by a non-zero quantized coefficient. In one embodiment, run-length encoder 610 follows an adaptively-generated scan pattern that tends to provide a long run of zero coefficients for the last run of the block. The adaptive run-length encoding of run-length encoder 610 is described in further detail in the '1022 application in the section entitled "Adaptive Run-Length Encoding."

Run-length encoder 610 also applies a run-val mapping table to map the run-val pairs to a sequence of run-val codes. This transformation of run-val pairs to run-val codes is described in further detail in the '1125 application in the section entitled "Run-Val Mapping Tables."

Huffman encoder 612 applies Huffman-type entropy (a.k.a. statistical or variable-length) coding to the run-val codes to generate the encoded data for the current band. The processing of Huffman encoder 612 is described in further detail in the '1096 application in the section entitled "Huffman Encoding."

As shown in FIG. 6, band encoder 504 also decodes the encoded band data to update the reference band used in encoding the corresponding band of another video frame. Since the run-length and Huffman encoding of 610 and 612 are lossless encoding steps, the decode loop of band encoder 504 may begin decode processing with inverse quantizer 614, which dequantizes the quantized coefficients to generate dequantized coefficients for the current band.

Inverse block transform 616 applies the inverse of forward block transform 606 to the dequantized coefficients to generate decoded differences for the current band. Motion-compensated adder 618 applies the motion vectors generated by motion estimator 602 to the current reference band to generate motion-compensated reference band data. Adder 618 also performs interband addition using the motion-compensated reference band data and the decoded differences to generate an updated reference band. The updated reference band is stored in memory 620 for use in generating the reference band for encoding the corresponding band of another video frame.

Those skilled in the art will understand that, when decoding the quantized coefficients for intra-frame encoded blocks, the output signals of inverse block transform 616 are the decoded pixels for the updated reference band and motion-compensated adder 618 is disabled.

Decode Processing

Figure 7:
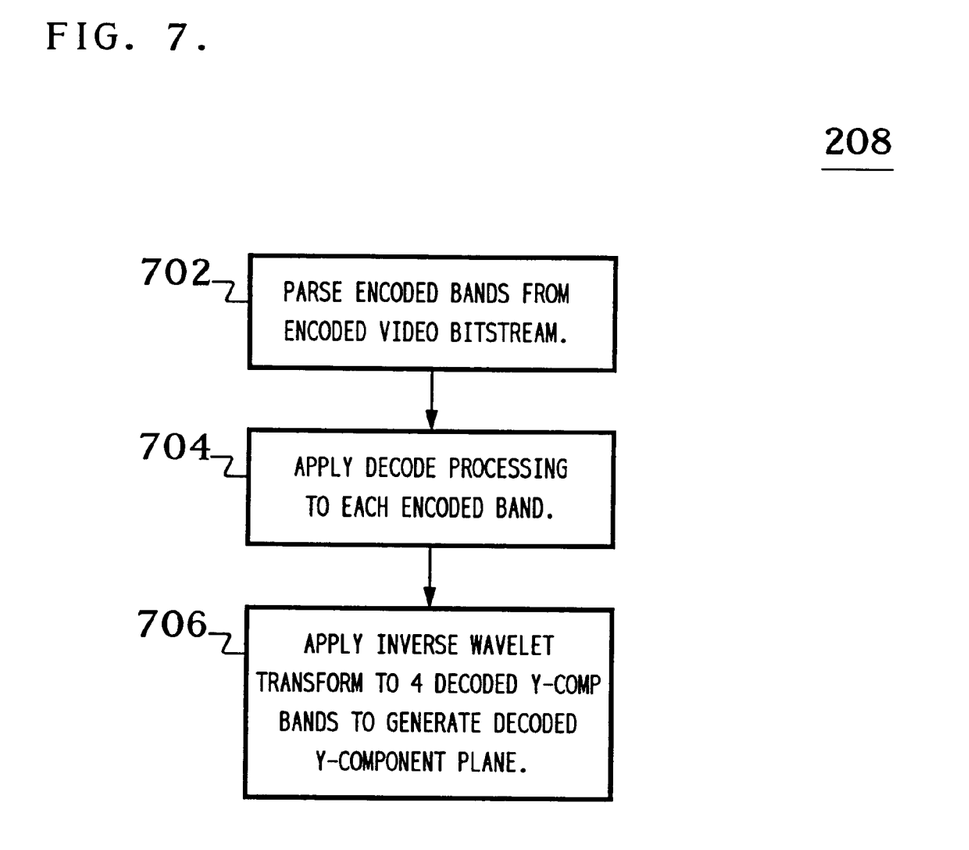
FIG. 7 is a process flow diagram of the decompression processing implemented by the host processor of the decoding system of FIG. 2 for each encoded frame of the encoded video bitstream.

Referring now to FIG. 7, there is shown a process flow diagram of the decompression processing implemented by host processor 208 of decode system 200 of FIG. 2 for each encoded frame of the encoded video bitstream, according to one embodiment of the present invention. Host processor 208 parses the encoded bands from the encoded video bitstream (step 702 of FIG. 7) and applies decode processing to each of the encoded bands (step 704). In the case where the Y-component plane was decomposed into four bands during encoding, an inverse transform is applied to the four decoded Y-component bands to generate the decoded Y-component plane (step 706). The decoded Y-component plane data are then processed with the decoded U- and V-component plane data to generate a decoded video image for display. One inverse transform is described in further detail in the '1022 application in the section entitled "Wavelet Transform."

Figure 8:
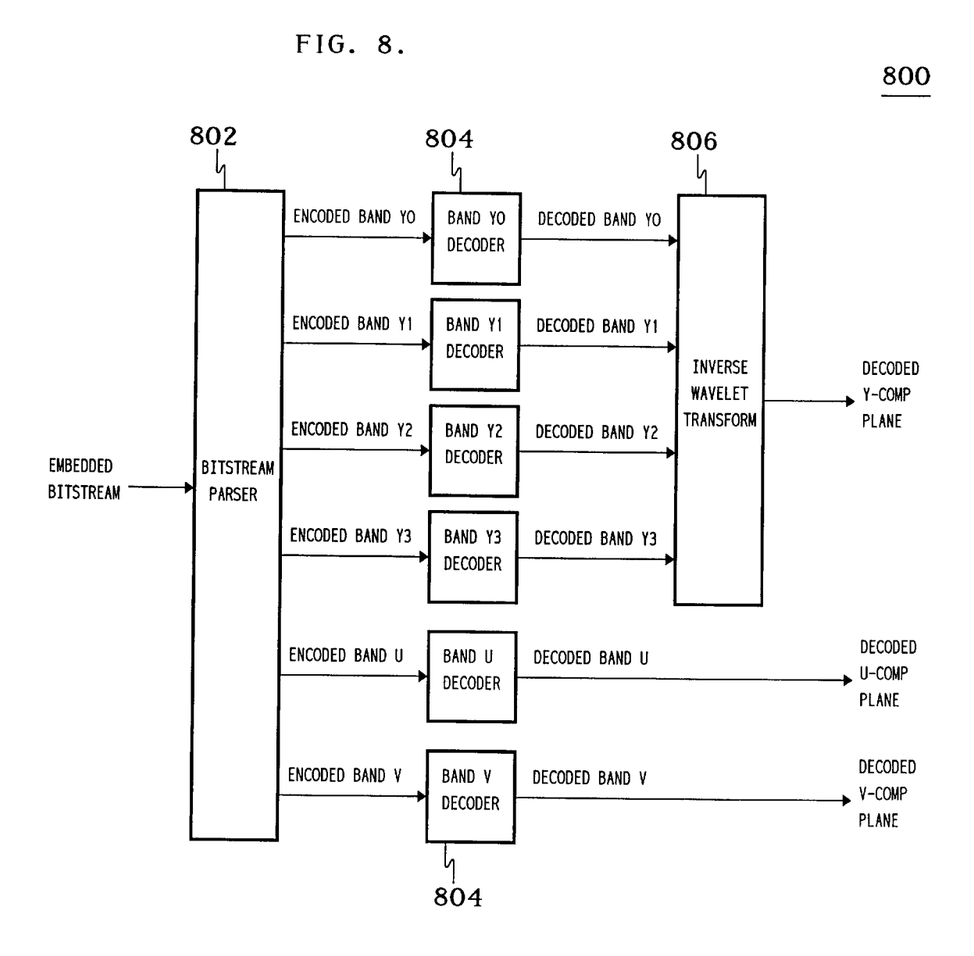
FIG. 8 is a block diagram of a frame decoder that implements the decompression processing of FIG. 7.

Referring now to FIG. 8, there is shown a block diagram of frame decoder 800 which implements the decompression processing of FIG. 7. Bitstream parser 802 parses the embedded bitstream into the encoded band sequences (step 702 of FIG. 7). Band decoders 804 decode the bands of encoded data for each frame (step 704 of FIG. 7) and inverse wavelet transform 806 applies an inverse wavelet transform to the decoded Y-component bands to generate the decoded Y-component plane (step 706 of FIG. 7). In one embodiment, there is a single band decoder 804 that sequentially decodes the different encoded bands.

Figure 9:
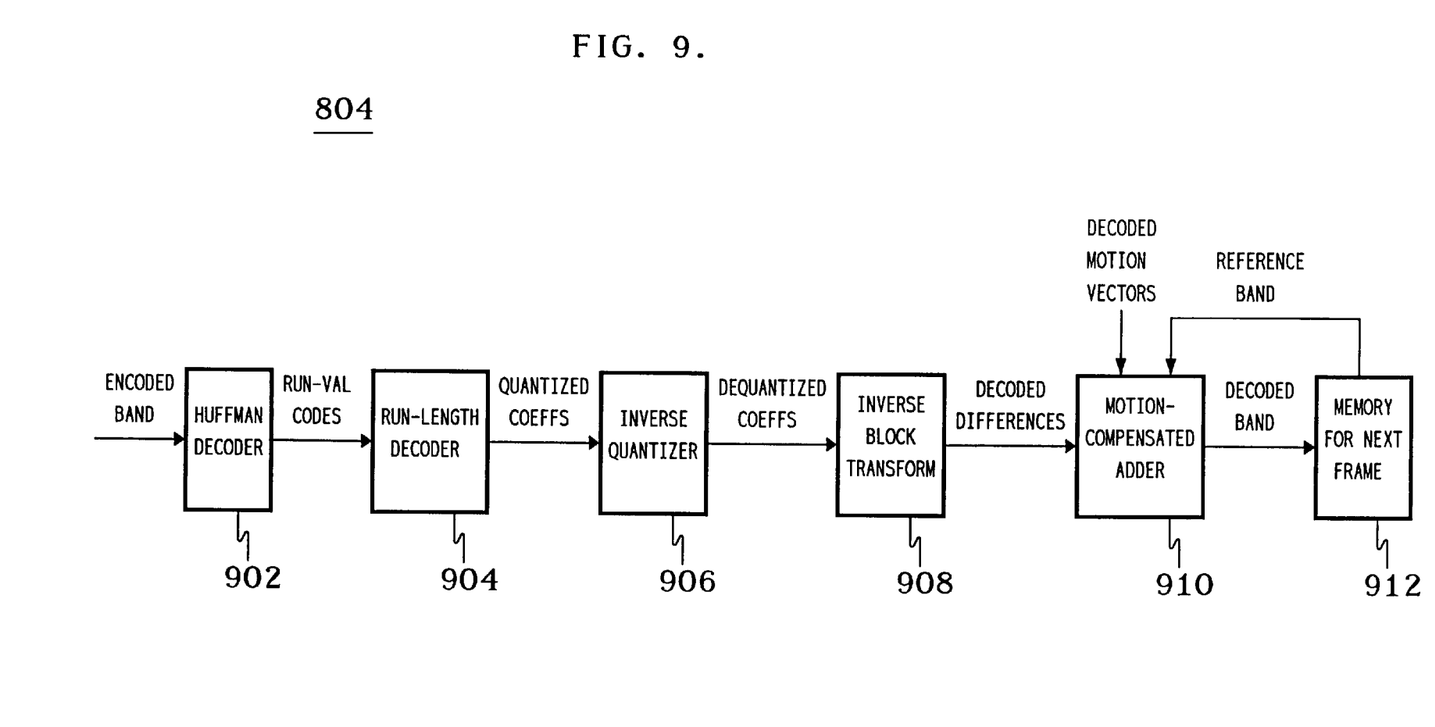
FIG. 9 is a block diagram of each band decoder of FIG. 8 when decoding an inter-frame encoded band of the encoded video bitstream.

Referring now to FIG. 9, there is shown a block diagram of each band decoder 804 of FIG. 8 when decoding an inter-frame encoded band of the encoded video bitstream, according to one embodiment of the present invention. Band decoder 804 of FIG. 9 reverses the encode processing of band encoder 504 of FIG. 6.

In particular, Huffman decoder 902 of FIG. 9 applies statistical decoding to the encoded data for the current band to reconstruct the run-val codes. The processing of Huffman decoder 902 is described in further detail in the '1022 application in the section entitled "Statistical Decoding."

Run-length decoder 904 transforms the run-length codes into quantized coefficients. Inverse quantizer 906 dequantizes the quantized coefficients to generate dequantized coefficients. Inverse block transform 908 applies the inverse of forward block transform 606 of FIG. 6 to the dequantized coefficients to generate decoded differences.

Motion-compensated adder 910 applies decoded motion vectors to the reference band to generate motion-compensated reference band data, and performs inter-frame addition using the motion-compensated reference band data and the decoded differences to generate the decoded data for the current band. The decoded band is then stored in memory 912 for use as a reference band for decoding the corresponding band of another video frame. If the decoded band corresponds to a Y-component band, the decoded band data are also used to reconstruct the decoded Y-component plane (step 706 of FIG. 7). Otherwise, the decoded band is either the decoded U- or V-component plane. In any case, the decoded band is used to generate the decoded image for display.

The decoding for intra-frame encoded blocks is equivalent to the decoding for inter-frame encoded blocks shown in FIG. 9, except that the motion-compensated addition of 910 is not performed. In that case, the output signals of inverse block transform 908 are the decoded pixels for the updated reference band.

Decode Rate Control

As described earlier, decode rate control refers to the encoding of image data taking into account the rate at which the resulting encoded bitstream can or will be decoded. Decode rate control may be implemented by an encoding system when the encoding system expects that a decoding system will have either insufficient processing capacity to decode the encoded data or extra processing capacity after decoding the encoded data. In either case, under decode rate control, the encoding system adjusts one or more encoding parameters as appropriate, where such adjustments will typically affect the decode processing rate of the decoding system.

In the case of typical video encoding schemes, there are many different parameters that can be changed during the course of video encoding that may affect the rate at which a given decoder will decode the resulting encoded bitstream. For example, in the video encoding scheme of FIGS. 3–6, there are many different encoding parameters that may be controlled during encoding that will affect the rate at which the decoder of FIGS. 8–9 will decode the resulting encoded bitstream. One embodiment in accordance with the present invention is directed to video and other image encoding that takes decode processing rate into consideration during the encoding process to control the selection of such encoding parameters used in the encoding process.

Figure 10:
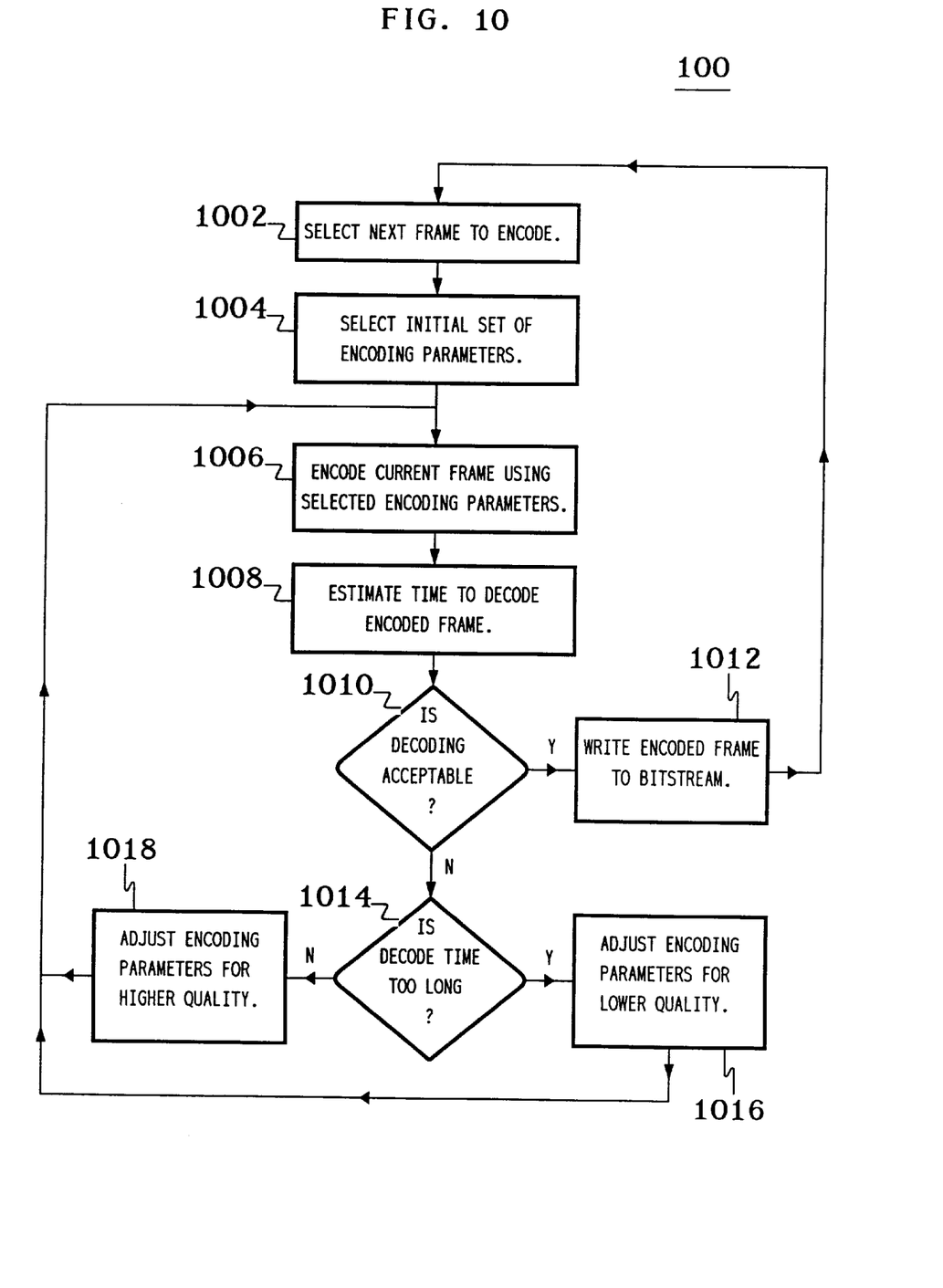
FIG. 10 is a flow diagram of the decode rate control processing implemented by the video encoding system of FIG. 1.

Referring now to FIG. 10, there is shown a flow diagram of the decode rate control processing implemented by video encoding system 100 of FIG. 1, according to one embodiment of the present invention. In the embodiment of FIG. 10, encoding system 100 performs non-real-time encoding of a video stream where the encoded bitstream is to be decoded by a known decoding system, such as decoding system 200 of FIG. 2, for example. During the non-real-time encode processing, encoding system 100 iteratively applies one or more different sets of encoding parameters to each video frame to ensure that the decoding of the final encoded frame is appropriate based on the capabilities of the known decoding system. The decoding will be appropriate if, on the one hand, the decoding does not take more processing time than is available in the decoding system and if, on the other hand, the decoding does not leave significant extra time available in the decoding system that could otherwise be used to decode encoded data that would provide significantly greater visual quality.

In particular, for each frame to be encoded (step 1002 of FIG. 10), a set of parameters that affect the encoding process is initialized (step 1004). In one embodiment, this initial set of encoding parameters is the same for each frame in the video stream. Alternatively, the initial set may vary from frame to frame. For example, the initial set could be the set of encoding parameters selected and used for the final encoding of the previous frame.

After encoding the current frame using the set of selected encoding parameters (step 1006), the time to decode the encoded frame is estimated (step 1008). This estimation step may involve the implementation of the actual decode processing to determine decode time. Alternatively or in addition, the time to decode may be estimated based on a model of the decode processor. For example, a table could identify different predicted decode rates for different sets of encoding parameters on different decoding platforms (e.g., a range of processors from an Intel i486™ 33 MHz processor to an Intel Pentium® Pro 300 MHz processor). These predicted decode rates could be derived during prior empirical analysis with the different processors and then compiled into the encoder in the form of one or more lookup tables.

If the decoding of the encoded frame is acceptable (step 1010), then the encoded frame is written to the bitstream (step 1012) and processing returns to step 1002 to repeat the processing for the next frame in the video stream. The determination of whether decoding is acceptable may be implemented in different ways. In one implementation, a target decode processing time is specified and, if the time to decode is within a specified range of the target decode processing time, then the decoding is deemed acceptable. If the decode time is outside the specified range, then decoding is unacceptable and processing continues to step 1014. Note that the range need not be symmetrical about the target decode processing time.

If the time to decode the encoded frame is too long (step 1014), then the decoding system may not have the processing capacity to decode the encoded frame without affecting the decoding of other encoded frames. In this case, one or more of the encoding parameters may be adjusted to reduce the visual quality (step 1016) and thereby tend to reduce the decode time. If however the decode time is too short (step 1014), then the decoding system may have extra processing capacity that would be available after decoding the encoded frame. In this case, one or more of the encoding parameters may be adjusted to increase the visual quality (step 1018) and thereby tend to increase the decode time to take advantage of the additional decoding system processing capacity.

The criteria used to determine whether the time to decode is acceptable (e.g., the specified range in step 1010) can be fixed for every frame in the video sequence or the criteria may vary from frame to frame. For example, the time allocated to decode encoded key frames (i.e., intra-encoded frames) may be different from (either more or less depending upon the decoder) the time allocated to decode encoded delta frames (i.e., inter-encoded frames).

The decision of which encoding parameters to change and how much to change them may be based on empirical analysis performed off line on typical video streams. Those skilled in the art will understand that different encoding parameters will affect decode rate and decode quality (not to mention bit rate) differently and to different degrees. The empirical analysis may be used to identify those encoding parameters that provide the greatest improvement (e.g., decrease) in decode rate with the least negative impact to decode quality. The results of such empirical analysis can be compiled into a set of tables that identifies, for example, different sets of encoding parameters that achieve different decode processing rates of acceptable quality.

In an alternative embodiment of the present invention, the first attempt at encoding the frame may give sufficient information for adjusting the encoding parameters to avoid having to repeat the entire iteration loop of steps 1006–1018. In this embodiment, either of steps 1016 or 1018 performs sufficient adjustment to the encoding parameters such that step 1006 is repeated once followed directly by step 1012.

The types of changes made to parameters in order to increase the visual quality may be different from the types of changes made to parameters in order to decrease the visual quality. Moreover, the types of changes made to parameters may be affected by how much the decode time differs from the target decode processing time. If a particular parameter is adjusted X % to achieve a Y % change in decode time, that does not mean that that same encoding parameter should be adjusted 2X % to achieve a 2Y % change. In fact, an entirely different encoding parameter may be selected in that case to achieve the desired change in decode time.

Figure 11:
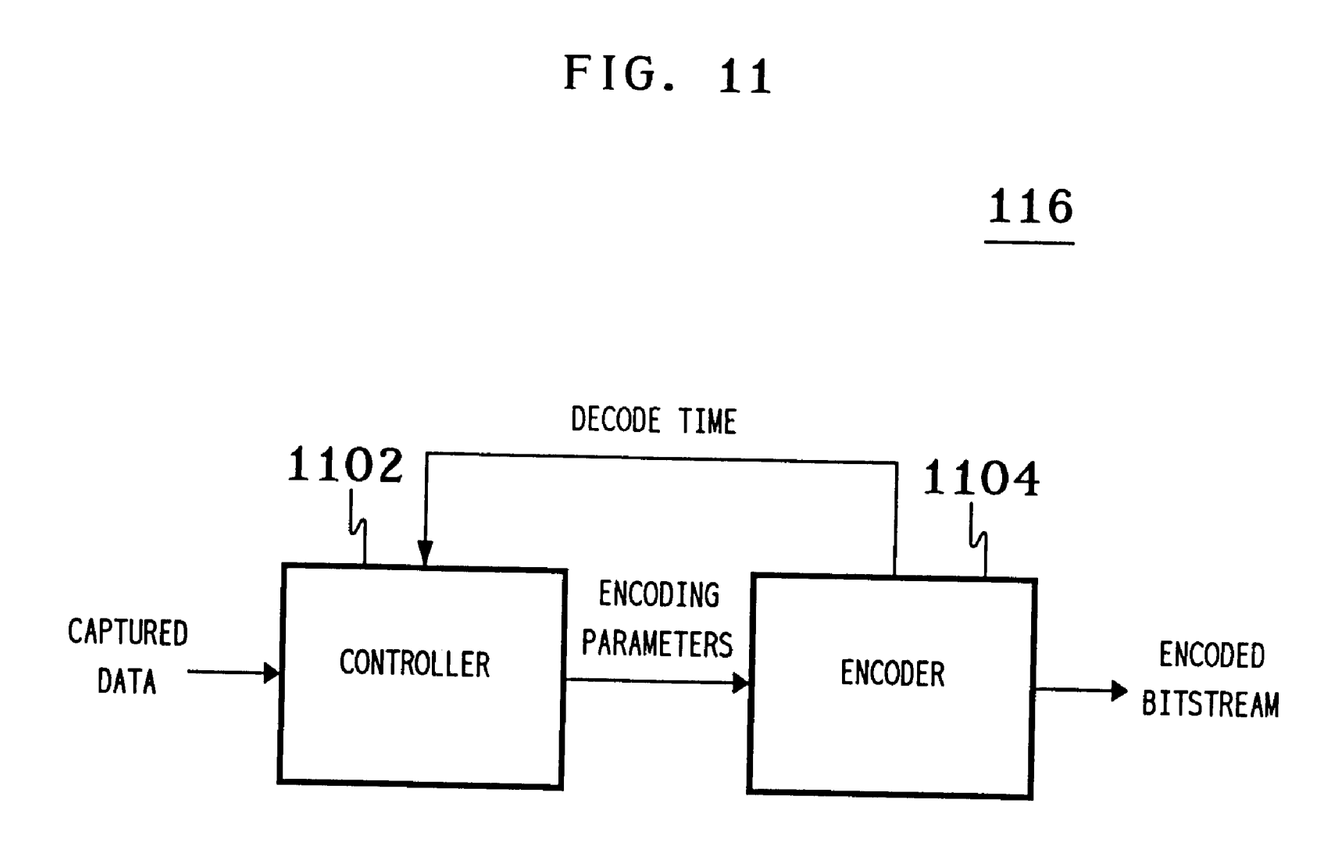
FIG. 11 is a block diagram of the host processor of the encoding system of FIG. 1 when implementing the decode rate control processing of FIG. 10.

Referring now to FIG. 11, there is shown a block diagram of host processor 116 of encoding system 100 of FIG. 1 when implementing the decode rate control processing of FIG. 10, according to one embodiment of the present invention. Controller 1102 controls the selection and adjustment of encoding parameters used by encoder 1104 to encode the video data. Controller 1102 adjusts the encoding parameters based, for example, on the decode time fed back from encoder 1104 to controller 1102. In one implementation, steps 1006 and 1008 of FIG. 10 are performed by encoder 1104, while controller 1102 performs the rest of the steps of FIG. 10.

One example of an encoding parameter that may be adjusted during video encoding to affect the visual quality and thereby affect the decode processing rate is the frequency of table rebuilds. As described in the section entitled "Run-Val Mapping Tables" in the '1125 application, the run-val mapping tables used by run-length encoder 610 may be changed within a video stream. Similarly, as described in the section entitled "Huffman Encoding" in the '1096 application, the Huffman tables used by Huffman encoder 612 may also be changed within a video stream. So can the quantization tables used by quantizer 608 and inverse quantizer 614.

Under one conventional video encoding strategy, the video encoder may change these lookup tables whenever doing so will reduce the size of the encoded bitstream. Every time the encoder changes a lookup table during encoding, the decoder rebuilds its copy of the lookup table to reflect that change. This rebuilding by the decoder tends to slow down the decode processing rate. If the frequency of having to rebuild lookup tables gets too great, the decoder may not have enough processing capacity to decode each frame in time for real-time motion video playback.

According to one video encoding embodiment of the present invention, however, the frequencies of changing such things as lookup tables and their impact on decode processing rate may be taken into account by the encoder during the video encoding process. In one embodiment, the video encoder may trade off encode efficiency for decode rate by allocating cycle counts for table rebuilds. For example, in this embodiment, tables are rebuilt only if the gain in encode efficiency is worth the impact to decode rate as determined by maintaining a cycle budget. In this particular embodiment, the encoder maintains the table rebuilds controlled on the average with a maximum cycle budget constraint for any one frame. If the average time is maintained within the cycle budget, then the decode rate should vary little from frame to frame.

Likewise, in this embodiment, the encoder implements the idea of a total cycle budget for table rebuilds for each frame. Actual cycle costs for table rebuilds are derived from experimentation with the decoder. The encoder maintains a parameter for allowable bits of inefficiency. If a table rebuild decreases the expected bit rate by more than this parameter, then the rebuild is considered to be worth performing. The table is then changed as long as the total cycle budget for the frame has not yet been expended.

The bit-efficiency parameter may be modified at the end of each frame via an adaptive method described as follows:

(1) Calculate the cycle budget error E for the current frame as the difference between the actual cycle expenditure $C_f$ for this frame minus the desired cycle budget $C_d$, as follows:
$$E=C_f-C_d$$

(2) Calculate the new bit efficiency parameter B' by adding the old bit efficiency parameter B to a gain constant u times the error E as follows:
$$B'=B+uE$$

This adaptive technique should maintain B at a desired value such that the desired decoder cycle budget, on the average, is used in table rebuilds. The parameter B then represents the number of bits of inefficiency allowed before a table rebuild is determined desirable. The parameter B will increase in segments of video where the statistics are changing fairly rapidly such that the encoder includes many table rebuilds.

The frequency of lookup table rebuilds is only one example of an encoding parameter that may be controlled during encode processing to affect the rate of decode processing. Other such encoding parameters include—but are not limited to—the following:

Global decomposition (i.e., forward wavelet transform): what if any components are to be decomposed and how many times (e.g., further decomposition of the Y0 band).

Transparency processing: number and/or size of dirty rectangle(s)

Motion compensation: whether motion compensation is enabled, whether motion vectors are inherited from one band to another within a frame, whether half-pixel motion vectors are allowed, whether bi-directional inter-frame differencing is enabled, the threshold levels used for determining whether blocks are to be encoded as inter, intra, or skipped blocks.

Forward block transform: for each band, what, if any, transform is to be applied (e.g., DCT, slant, Haar, none).

Quantization: selection/change of quantization level (i.e., change of quantization table).

Run-length encoding: selection/change of scan pattern and/or run-val mapping table.

Huffman encoding: selection/change of Huffman table.

In general, any encoding parameter that affects the time to decode the resulting encoded data is a candidate for the decode rate control of the present invention.

As an example, consider the selection by an encoder of a codebook for statistical coding. Changing codebooks can affect decode rate in a number of ways. The very act of changing from one codebook to another will cost a decoder some amount of processing time. In general, using a different codebook may affect which symbols are present in the encoded stream, how frequently each symbol occurs, and the total number of symbols. All of these may affect the rate at which the decoder decodes the symbols in the encoded stream.

The net change in decode processing rate (either positive or negative) may be weighed against the resulting changes in encoding efficiency (e.g., bit rate) and image quality. An encoder that is concerned primarily with bit encoding efficiency may avoid changing codebooks frequently if those changes have relatively small impact on bit rate. On the other hand, an encoder that addresses decode processing rate in accordance with the present invention may take the net impact to decode processing rate into consideration when deciding whether to change codebooks. In one embodiment, such an encoder could, prior to generation of the set of source symbols to be statistically encoded, determine whether a combination of changes in the encoding of a portion of the image and changes in the codebook used for statistical encoding taken together would be sufficient to reduce the time to decode the symbols by an amount that offsets the cost of using the new codebook. This would allow the encoder to decide to make codebook changes based upon the potential effect on the decoder.

As mentioned earlier, the encoder should account accurately for all cycles spent in the decoder. To that end, the encoder, in one embodiment, could use such parameters as the number of coded blocks in a frame, the average encoded symbol length for the statistically encoded symbols for the current frame, and the average number of symbols per block encoded to approximate the processing time to decode the blocks in the frame.

For example, if the encoder determines that the video cannot be decoded in the desired time on a particular decoding platform, the encoder could increase the quantization level to reduce the average number of symbols per coded block. Typically, the fewer the symbols, the faster the decode. Similarly, the encoder could increase the number of blocks that are encoded as skip or empty blocks. This can be accomplished by increasing the degree of difference that is allowable before a block is selected for coding. Decreasing the number of coded blocks tends to increase the decode processing rate.

On the other hand, if quantization levels and/or coding thresholds get so high that a decoder will have "extra" processing time available (e.g., unused processing bandwidth), encoding parameters may be adjusted to yield a higher quality result, while increasing the decode processing rate to use the extra processing time. Bit rate may also need to be taken into consideration in deciding which encoding parameters to adjust and by what amounts.

In another embodiment, an encoder may also affect decode processing rate by controlling which transforms to apply to different sets of data. For example, if there is extra decode processing time available when applying a Haar transform to all four bands of Y-component data, then the encoder may change to apply a Slant transform to one or more of those bands. A Slant transform, which typically uses more decode processing time than a Haar transform, will also tend to provide a higher quality result. Thus, in this case, the encoder may employ the extra decode processing time to improve the quality of the video coding.

The target decode processing rate for this particular embodiment of the present invention may be represented in different forms. In one embodiment, the target decode processing rate may be expressed in terms of processor cycles per second (e.g., in a variable frame-rate environment). Those skilled in the art will understand that, in alternative embodiments, other expressions of the target decode processing rate of the present invention are also possible, such as processor cycles per image or frame.

Embodiments in accordance with the present invention have been described in the context of video encoding. Those skilled in the art will understand that, in alternative embodiments, the present invention may be applied to other image data such as still images or graphics images, in addition to motion video streams.

Embodiments of the present invention have also been described in the context of off-line video encoding in which the encoding system may repeat the encoding of each frame one or more times using different sets of encoding parameters. Those skilled in the art will understand that, in alternative embodiments, the present invention may also be implemented in real-time video encoding applications such as during video conferencing where a video stream is compressed in real time for transmission to a remote node for real-time decoding and playback. In such situations, the encoding system may not be able to repeat its encode processing for each frame. Moreover, the decoding system in a remote node may be able to communicate its current available processing capacity to the encoding system in the local node. The processing capacity of the decoding system may vary depending upon other operations in the remote node (e.g., audio/data conferencing or other data processing such as file transfers). The encoding system in the local node may then use that information to select dynamically the target decode processing rate for its encode processing, and use that target decode processing rate to select and change the encoding parameters from frame to frame, or even within a frame. In one possible implementation, the encoding system can project the decode processing rate before it finishes encoding a frame and can then elect to restart encode processing for that frame with an adjusted set of encoding parameters without completing the current frame encode.

The present invention can be embodied in the form of methods and apparatuses for practicing those methods. Alternatively, the present invention can be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention may also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose microprocessor, the program code segments combine with the microprocessor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding image data, comprising the steps of:
   (a) controlling at least one encoding parameter based on decode processing rate; and
   (b) encoding the image data based on the controlled encoding parameter to generate an encoded bitstream.

2. The method of claim 1, wherein the encoding parameter relates to a frequency with which a decoder of the encoded bitstream rebuilds one or more lookup tables used in decoding the encoded bitstream.

3. The method of claim 2, wherein the lookup tables comprise at least one of Huffman tables used in variable-length decoding, run-val mapping tables used in run-length decoding, and quantization tables used in dequantization.

4. The method of claim 2, wherein step (a) comprises the step of maintaining a cycle budget for decoding the image data, wherein the cycle budget is used to determine whether to change a lookup table.

5. The method of claim 1, wherein step (a) comprises the steps of:
   (1) selecting a value for the encoding parameter;
   (2) encoding a frame of image data using the selected value to generate an encoded frame;
   (3) determining a decode time for the encoded frame;
   (4) comparing the decode time to a target decode time;
   (5) adjusting the value of the encoding parameter based on comparison of the decode time to the target decode time to generate an adjusted value for the encoding parameter; and
   (6) encoding the frame using the adjusted value to generate an adjusted encoded frame.

6. The method of claim 1, wherein step (a) comprises the steps of:
   (1) selecting a value for the encoding parameter;

(2) encoding a first frame of image data using the selected value to generate an encoded first frame;

(3) determining a decode time for the encoded first frame;

(4) comparing the decode time to a target decode time;

(5) adjusting the value of the encoding parameter based on comparison of the decode time to the target decode time to generate an adjusted value for the encoding parameter; and (6) encoding a second frame using the adjusted value to generate an encoded second frame.

7. The method of claim 6, wherein step (a)(3) comprises the step of determining the decode time based on a model of a target decoding system.

8. The method of claim 1, wherein the image data comprises video data in video stream.

9. The method of claim 8, wherein an initial encoding parameter for a current frame of the video stream is based on a final encoding parameter used to encode a previous frame of the video stream.

10. The method of claim 8, wherein the decode processing rate can change from frame to frame within the video stream.

11. The method of claim 8, wherein the decode processing rate is based on frame type of each frame in the video stream.

12. The method of claim 8, wherein:

the video data is encoded by a local encoding system for real-time transmission to a remote decoding system;

the remote decoding system transmits its current decode processing capacity to the local encoding system; and the local encoding system uses the current decode processing capacity of the remote decoding system to determine the decode processing rate for a current frame of the video stream.

13. The method of claim 1, wherein:

the image data comprises video data in a video stream; the decode processing rate can change from frame to frame within the video stream; and step (a) comprises the steps of:

(1) selecting an initial encoding-parameter value for a current frame of the video stream based on a final encoding-parameter value used to encode a previous frame of the video stream;

(2) encoding the current frame of image data using the initial encoding-parameter value to generate an encoded current frame;

(3) determining a decode time for the encoded current frame;

(4) comparing the decode time to a target decode time;

(5) adjusting the initial encoding-parameter value based on comparison of the decode time to the target decode time to generate an adjusted encoding-parameter value; and (6) encoding a next frame using the adjusted encoding-parameter value to generate an encoded next frame.

14. The method of claim 1, wherein step (a) comprises the step of determining the decode processing rate based on a model of a target decoding system.

15. An apparatus for encoding image data, comprising:

(a) means for controlling at least one encoding parameter based on decode processing rate; and (b) means for encoding the image data based on the controlled encoding parameter to generate an encoded bitstream.

16. The apparatus of claim 15, wherein means (a) is adapted to:

(1) select a value for the encoding parameter;

(2) encode a first frame of image data using the selected value to generate an encoded first frame;

(3) determine a decode time for the encoded first frame;

(4) compare the decode time to a target decode time;

(5) adjust the value of the encoding parameter based on comparison of the decode time to the target decode time to generate an adjusted value for the encoding parameter; and (6) encode a second frame using the adjusted value to generate an encoded second frame.

17. A machine-readable medium having stored thereon a plurality of instructions, the plurality of instructions including instructions that, when executed by a machine, cause the machine to perform the steps of:

(a) controlling at least one encoding parameter based on decode processing rate; and (b) encoding the image data based on the controlled encoding parameter to generate an encoded bitstream.

18. The medium of claim 17, wherein step (a) comprises the steps of:

(1) selecting a value for the encoding parameter;

(2) encoding a first frame of image data using the selected value to generate an encoded first frame;

(3) determining a decode time for the encoded first frame;

(4) comparing the decode time to a target decode time;

(5) adjusting the value of the encoding parameter based on comparison of the decode time to the target decode time to generate an adjusted value for the encoding parameter; and (6) encoding a second frame using the adjusted value to generate an encoded second frame.

19. A computer system, comprising:

a processor; and a memory coupled to the processor, wherein the memory stores a sequence of instructions which, when executed by the processor, cause the processor to perform the steps of:

(a) controlling at least one encoding parameter based on decode processing rate; and (b) encoding the image data based on the controlled encoding parameter to generate an encoded bitstream.

20. The system of claim 19, wherein step (a) comprises the steps of:

(1) selecting a value for the encoding parameter;

(2) encoding a first frame of image data using the selected value to generate an encoded first frame;

(3) determining a decode time for the encoded first frame;

(4) comparing the decode time to a target decode time;

(5) adjusting the value of the encoding parameter based on comparison of the decode time to the target decode time to generate an adjusted value for the encoding parameter; and (6) encoding a second frame using the adjusted value to generate an encoded second frame.

* * * * *